United States Patent
Baehr et al.

[11] 4,233,368
[45] Nov. 11, 1980

[54] METHOD FOR THE PRODUCTION OF GLASS FIBER-REINFORCED GYPSUM SHEETS AND GYPSUM BOARD FORMED THEREFROM

[75] Inventors: Donald O. Baehr, Arlington Heights; David G. Izard, Hoffman Estates, both of Ill.

[73] Assignee: United States Gypsum Company, Chicago, Ill.

[21] Appl. No.: 912,776

[22] Filed: Jun. 5, 1978

[51] Int. Cl.³ .......................... B28B 3/00; B32B 9/04; C04B 43/02
[52] U.S. Cl. .................................... 428/538; 162/156; 264/121; 264/284; 264/333; 264/518; 428/426
[58] Field of Search .................. 156/39, 4 Z, 62.2; 162/154, 156; 264/121, 333, 87, 284, 518; 428/538, 426

[56] References Cited

U.S. PATENT DOCUMENTS

| | | | |
|---|---|---|---|
| 1,862,318 | 6/1932 | Ruby | 425/8.1 |
| 2,230,880 | 2/1941 | Brown | 264/280 X |
| 2,658,848 | 11/1953 | Labino | 162/156 X |
| 2,886,484 | 5/1959 | French et al. | 162/154 X |
| 3,470,977 | 10/1969 | Shannon | 190/634 |
| 3,616,173 | 10/1971 | Green | 156/39 X |
| 3,773,533 | 11/1973 | Omoto et al. | 156/39 X |
| 3,852,081 | 12/1974 | Lehman | 106/110 X |
| 4,090,883 | 5/1978 | Rauschenfels | 106/110 X |

FOREIGN PATENT DOCUMENTS

| | | | |
|---|---|---|---|
| 881165 | 11/1961 | United Kingdom | 156/39 |
| 1267756 | 3/1972 | United Kingdom | |

*Primary Examiner*—Lorraine T. Kendell
*Attorney, Agent, or Firm*—Samuel Kurlandsky; Robert H. Robinson; Kenneth E. Roberts

[57] ABSTRACT

A fiber-reinforced cementitious sheet is formed by first co-mixing in an air current reinforcing fibers such as glass fibers, and cementitious mineral materials in finely particulate form such as calcium sulfate hemihydrate, both in substantially dry form, depositing the mixture on a moving foraminous surface by means of the air current to form a sheet, applying water as by spraying in at least an amount which is stoichiometrically sufficient to hydrate the calcium sulfate hemihydrate to the dihydrate form and to provide the necessary degree of plasticity to the mixture, densifying the sheet by compression, and setting and drying the sheet. A pair of sheets may be utilized as face sheets and, prior to setting, combined with a core formed of for example a calcium sulfate hemihydrate slurry, and the sheets and core then set and dried to form a paper-free gypsum board having excellent strength, surface hardness, and fire-resistant properties.

32 Claims, 6 Drawing Figures

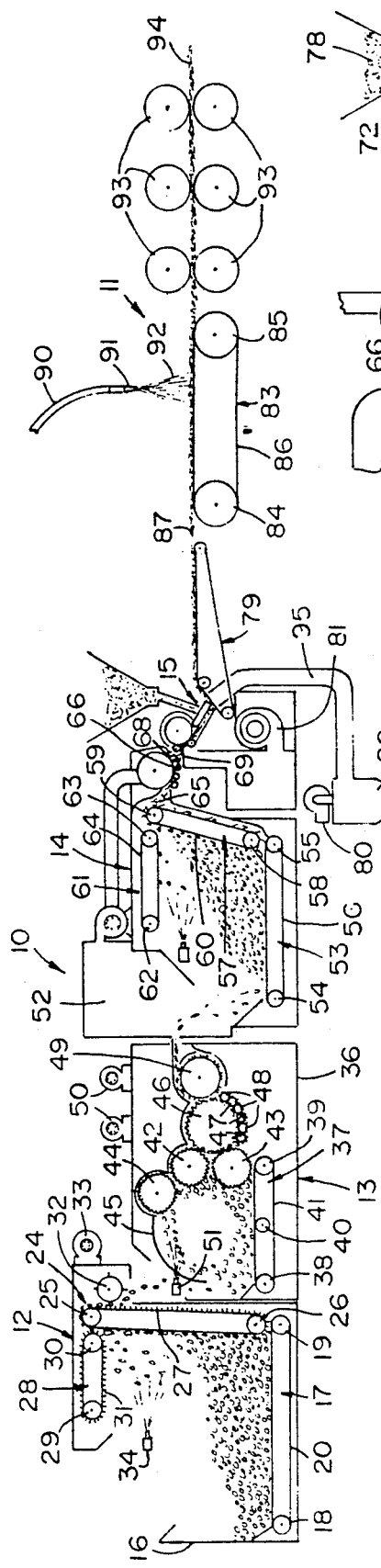

METHOD FOR THE PRODUCTION OF GLASS FIBER-REINFORCED GYPSUM SHEETS AND GYPSUM BOARD FORMED THEREFROM

BACKGROUND OF THE INVENTION

1. Field of the Invention

The present invention relates to cementitious construction sheets, such as gypsum wallboard and more particularly refers to a new method for forming paper-free glass fiber-reinforced cementitious sheets such as gypsum and utilizing the sheets with a standard cementitious slurry core to form paper-free wallboard, and to the products formed thereby.

2. Description of the Prior Art

Wall panels or wallboards made of rehydrated stucco conventionally comprise a gypsum core of uniform density sandwiched between two paper cover sheets. Such panels can be mass produced and erected so inexpensively that they have largely replaced prior building techniques using wood panels or plaster. As the usage of such wallboard has expanded, however, specialty uses such as walls in high-rise office buildings and apartments have placed a premium on certain properties. Specifically, shaft walls used, for example, as elevator shafts, air return shafts, and stairwells are subject in some instances to very strict fire regulations. Thus there is a trend in municipal fire codes towards requiring a 0-0-0 fire rating for the exposed surface of elevator shafts, that is, having zero flame spread, zero smoke, and zero toxic gas generation. It has not been possible to achieve such ratings as long as paper-covered wallboard is used, due to the combustibility or at least the smoke-generation capability, of the paper cover sheets. Such paper cover sheets are further troublesome in that they appreciably delay the drying time of the board during its manufacture.

A further problem characteristic of certain elevator shafts is that wind loading causes constant flexing of the wallboard. Thus, when used in such walls, the wallboard must have good flexural strength—a physical property not exhibited by rehydrated stucco alone due to its low modulus of rupture.

Some presently manufactured wallboard does include various ingredients which impart fire resistance to the board. For example, glass fibers on the order of one-half inch in length have been incorporated throughout the core of paper-covered gypsum wallboard used to line elevator shaft walls, on a weight percent basis of about 0.25% of the weight of the board. However, such fibers are not long enough to contribute significantly to the flexural strength of the board, as the concentration is insufficient, and at that length, the fibers' pull-out strength is insufficient.

Numerous methods have been developed through the years to combine glass fibers and gypsum in order to produce various articles such as reinforced gypsum wallboard. It was early realized that in order to develop good strength properties the glass fibers must be evenly dispersed and a gypsum matrix must be used which has high strength.

When glass fibers and gypsum are mixed in the form of an aqueous slurry, the length and amount of fibers which may be added are limited in order to prevent balling of the fiber during mixing. Excess water is also required to make the slurry sufficiently fluid to be formed into the desired article. The use of excess water reduces the strength of the gypsum matrix. This is disclosed in British Pat. No. 1,204,541. In order to remove excess water, a means of applying suction and pressure to the formed board has been developed. This process is cumbersome and costly and not well adapted to high speed production.

A similar approach is illustrated in New Zealand Pat. No. 155,679, which teaches a gypsum panel constructed with glass fibers of various lengths, dispersed generally throughout the rehydrated stucco. Such a construction has eliminated the need for a paper cover sheet. However, the process of making such panels is difficult, time-consuming, and involves the use of a large proportion of glass fibers, inasmuch as they are distributed more or less uniformly throughout the board or panel.

Another prior art process for producing glass fiber-containing gypsum board involves co-spraying discontinuous glass fibers and gypsum in an aqueous slurry onto a moving belt. Special low water demand plaster is used, or suction is used to remove the excess water. The major disadvantages of this process are that the fiber strands are not dispersed into individual filaments of which they are formed, thus reducing the efficiency of the fiber as a reinforcing agent, and that the fibers are not sufficiently mixed with the plaster.

Glass fiber mats have also been used to reinforce gypsum. These mats may be in the form of continuous or discontinuous, random oriented fiber, or as woven mats. The mats are saturated with gypsum using various means and methods. One method is described in Canadian Pat. No. 993,773. The mats are fabricated with glass fiber strands each consisting of a plurality of glass fiber filaments. The gypsum slurry does not saturate the fiber strand and therefore the reinforcing efficiency of the fiber is reduced. Special low water demand gypsum such as alpha-calcium sulfate hemihydrate must be used to obtain high gypsum strength. Alternatively, excess water must be removed by means of suction.

In copending U.S. application Ser. No. 666,539, filed Mar. 15, 1976, and which is a continuation of U.S. Ser. No. 592,960 filed July 3, 1975, now abandoned, which is in turn a continuation of U.S. Ser. No. 415,038 also now abandoned, there is disclosed a reinforced gypsum board comprising a core of relatively low density being free of glass fibers, and provided on both surfaces thereof with skin layers formed of rehydrated gypsum having glass fibers dispersed therein. Preferably the outer layers are formed of gypsum having a higher density than the gypsum of the core. The preferred material for making the higher density outer layers is alpha calcium sulfate hemihydrate. Each outer layer is preferably bonded to the core by intercrystalline growth during the forming process. In forming the product, an aqueous stucco slurry containing glass fibers is deposited on a moving flat surface to form one outer layer, a low density aqueous slurry of calcium sulfate hemihydrate is deposited over the first outer layer to form a core, and a second outer layer of an aqueous slurry of calcium sulfate hemihydrate containing glass fibers is deposited over the core layer. No paper cover sheets are applied to the outer surfaces of the board. The resulting gypsum wallboard is relatively light since a low density gypsum is used for one core, and is very strong due to the glass fibers contained in the outer layers. A further advantage of the product is that there are no cover sheets to hinder the evaporation of excess water in the drying kiln, thereby reducing the processing time and reducing the cost of fuel for drying.

The resulting board also has a high flexural strength. Moreover, due to the central plane of symmetry of the board the strength is the same regardless of the face on which it is measured. Because a relatively low density gypsum is used for the core and relatively high density gypsum is used for the thin outer skins, the increase in strength is achieved without a concomitant increase in overall weight. The product is stated to be excellent for use in elevator shaft wall and for use in elevator air return shafts and stairwells where the product is subject to very strict fire regulations, and must undergo considerable flexing due to wind loading.

In U.S. Pat. No. 3,682,670, there is disclosed a process for preparing fiber-containing plaster products wherein glass wool and/or rock wool is carded, plaster powder added to the fibers as they are carded to provide a dry composition, and the dry mixture is then introduced into an excess of water to form a slurry which is subsequently cast in the form of boards. However, this process is somewhat deficient in that a large excess of water is introduced which must be subsequently removed by drying. Additionally, the carding process does not produce a good uniform mix of the fibers and plaster.

In U.S. Pat. No. 1,862,318, a method is disclosed for producing plaster board containing cotton linters which comprises first depositing a layer of gypsum on a moving belt subsequently depositing the cotton linters thereover while carding, and finally sprinkling water over the layer thus formed and compressing the layer by rolling. In this method, because the gypsum and fibers are not premixed but, merely sprinkled onto the belt, a uniform layer is not produced.

SUMMARY OF THE INVENTION

It is therefore an object of the present invention to provide a novel method for preparing cementitious construction sheets having reinforcing fibers dispersed therein.

It is a further object to provide a cementitious construction sheet of the type described which utilizes a minumum of water for setting the sheet.

It is a further object to provide a method for forming construction wallboard free of paper cover sheets by combining a pair of cementitious construction sheets of the type described together with a settable cementitious core.

It is still further an object to provide a method as described wherein only sufficient water is added to set the cementitious material of the outer layers to provide adequate setting without the need to subsequently evaporate a large excess of water during the drying stage.

These and other objects, advantages and functions of the invention will be apparent upon reference to the specification and to the attached drawings illustrating the preferred embodiments of the invention, in which like parts are identified by like reference symbols in each of the views.

According to the invention, thin layers of a cementitious material such as rehydrated gypsum containing fibers such as glass fibers are prepared by mixing together in a flowing stream or current of gas, such as air, a substantially dry water-settable cementitious material, such as calcium sulfate hemihydrate, and fibers, such as glass fibers. The dry mixture is deposited by means of the flowing gas stream or current such as an air stream or current onto the surface of a moving belt which is preferably foraminous or perforated, such as a screen, to permit the gas to pass therethrough while depositing the solid material in the form of a sheet. Subsequently water is sprayed onto the dry sheet in an amount sufficient to provide adequate plasticity and to completely set the calcium sulfate hemihydrate. Water is used slightly in excess of the stoichiometric amount for complete setting and for adequate plasticity, but without providing a large excess of water. The sheet thus formed is passed between compression rolls. An aqueous slurry of calcium sulfate hemihydrate may then be deposited over the compressed layer and a second compressed layer of gypsum identical to the bottom layer placed over the slurry. The gypsum of both the outer layers and of the core is then permitted to set and is subsequently dried in a kiln. The resulting product is fire-resistant, strong, and relatively light.

Throughout the specification and claims, wherever the term "stucco" is utilized, it is intended to have the meaning attributed to it by those skilled in the gypsum art. As used herein, the term "stucco" denotes calcined gypsum or calcium sulfate hemihydrate, either in the alpha or in the beta form.

BRIEF DESCRIPTION OF THE DRAWINGS

In the drawings:

FIG. 1 is a side elevational diagrammatic view of an apparatus used to produce glass fiber-reinforced gypsum sheets according to the invention.

FIG. 2 is an enlarged cross-sectional view of a portion of the apparatus of FIG. 1.

FIG. 3 is a side elevational diagrammatic view showing the apparatus utilized for producing gypsum board having glass fiber-reinforced outer layers.

DESCRIPTION OF THE PREFERRED EMBODIMENTS

Figure 5:
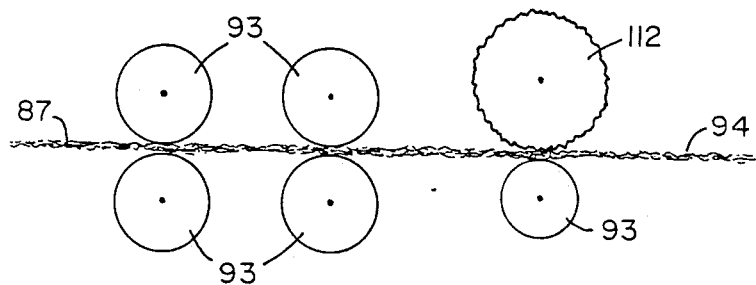
FIG. 5 is a side elevational diagrammatic view showing apparatus for increasing the density of the formed sheet and having means for embossing one surface of the sheet.

Referring to FIG. 1, an apparatus is shown for carrying out the process of the present invention for forming a glass fiber-reinforced gypsum sheet, and comprises generally an apparatus 10 for preparing the glass fiber and mixing the fibers with stucco or calcium sulfate hemihydrate, and depositing the mixture on a screen by means of an air current; and an apparatus 11 for conveying the layer of glass fibers and stucco, applying a water spray thereto, and rolling the wet layer to increase its density.

The glass fiber preparation and stucco mixing apparatus 10 is generally a commercial apparatus produced by the Rando Machine Corporation, Macedon, N.Y., and is marketed under the Registered Trademark "RANDO". The apparatus is made up of several sections including a prefeeder 12, an opener blender 13, a feeder 14, and a mixer and air depositing apparatus 15.

The prefeeder 12 comprises a housing 16, a floor apron 17 comprised of a pair of rolls 18 and 19, and an endless belt 20 mounted thereon. The apparatus further comprises an elevating apron 24 comprising a pair of rolls 25 and 26 and a barbed endless belt 27 mounted thereon. A stripper apron 28 is horizontally mounted in the upper portion of the chamber and comprises a pair of rolls 29 and 30 having a barbed endless belt 31 mounted thereon. A doffer roll 32 is mounted to cooperate with elevating apron 24 to remove glass fibers from the surface thereof. An electric motor 33 is operatively connected to drive the various endless belts. An anti-static spray nozzle 34 and associated equipment (not shown) are provided to prevent the formation of static charges which might cause the glass fibers to clump.

The fiber opener and blender 13 comprises a housing 36 having therein a floor apron 37 comprised of rolls 38, 39 and 40 and an endless belt 41 mounted thereover. Barbed worker rolls 42 and 43 cooperate with a stripper roll 44 to open up the cut glass strands of the clippings and separate them into individual fibers. A hopper cover 45 prevents the open fibers from escaping. A main cylinder 46 cooperates with small worker rolls 47 and small stripper rolls 48 to further separate the glass fibers and transport the fibers to an air brush 49. Motors 50 are operatively connected to the various rolls and provide motor power. An anti-static spray nozzle 51 and associated equipment (not shown) prevents static charges from building up.

The feeder 14 comprises a fiber separator 52, and a floor apron 53 comprised of rolls 54 and 55 and having an endless belt 56 mounted thereon. A vertically positioned elevating apron 57 comprises a pair of rolls 58 and 59 and an endless conveying belt 60 mounted thereover, conveying the fibers to an upper portion of the chamber which contains a horizontally mounted stripper apron 61 mounted on rolls 62 and 63 and having a barbed endless belt 64 mounted thereon.

As shown in greater detail in FIG. 2, an air bridge 65 connects to a feed mat condenser screen 66. A roll conveyor 68 cooperates with a feed plate 69 and feed rolls 70 to convey the fibers forward. A nose bar 71, lickerin 72 and saber roll 73 convey the fibers into a venturi chamber or duct 74 where a feeder 77 feeds stucco or other cementitious materials 78 into the venturi chamber 74 where the stucco is intimately mixed with the fibers by the air current passing through the venturi chamber 74. A condenser screen 79 in the form of an endless belt mounted on rolls is provided for collecting the air-blown mixture of glass fibers and cementitious material and conveys the formed web 87 to water treatment conveyor portion 83. Air current for mixing the stucco and fiber in the venturi chamber 74 and depositing the mixture on the condenser screen 79 is provided by blowers 80 and 81. The air is conveyed to a dust collector 82 for removing stucco and fibers which may have passed through the condenser screen 79 by means of a duct 95.

The web passes to a water treatment conveyor system 83 comprising rolls 84 and 85, and an endless belt 86 mounted thereover. A water spray 92 is provided by means of a water duct 90 and a nozzle 91. The water treated web 87 then passes through densification rolls 93 to form a densified fiber-reinforced gypsum sheet 94.

In operation chopped glass fiber strands are introduced into the prefeeder 12 where, after preliminary processing, they are introduced into the fiber opener and blender 13. Here the various barbed rolls open up the glass fiber strands and free the individual glass fibers. The fibers are then conveyed to the feeder 14 where they are ultimately introduced into the venturi duct 74. The cementitious mixture such as stucco 78 is fed from the feeder 77 into the venturi chamber 74, where it is intimately mixed by the air stream with the glass fibers. The mixture is then desposited on the condenser screen 79. A vacuum is maintained below the screen for directing the air stream through the screen to assist in directing the stucco and glass fibers towards the surface. The deposited web comprising glass fibers and stucco is then conveyed by the condenser screen 79 to the water treatment conveyor system 83, where water is sprayed over the web in an amount just sufficient to permit the stucco to become hydrated and to form set gypsum or calcium sulfate dihydrate. Only a very slight excess of water if any need to be used to provide suitable plasticity. The water-treated web then passes through densification rollers and subsequently sets to a very hard dense sheet of glass fiber-reinforced gypsum, and is subsequently dried.

Referring to FIG. 3, an apparatus is shown which is used to apply two glass fiber-reinforced sheets 94 to the upper and lower surfaces of a deposited gypsum slurry. The apparatus comprises a moving endless belt 100 mounted on rolls 101, 102 and 103. Additionally a compression roll 104 is mounted for compressing the two glass fiber-reinforced sheets 94 against the gypsum slurry.

In operation two glass fiber-reinforced sheets 94 as formed by the apparatus of FIG. 1 are introduced into the apparatus, one sheet being supported on the moving belt 100. A conventional stucco slurry 98 is poured onto the lower sheet from a slurry mixer 99 and then the upper sheet 94 compressed against the slurry 98 by means of the rolls 102 and 104. The three layered structure is then permitted to set, and the excess water subsequently evaporated in a kiln.

Figure 4:
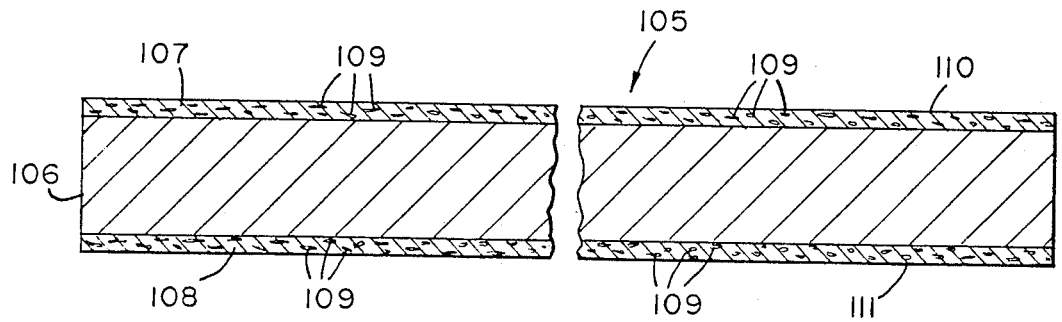
FIG. 4 is a cross-sectional view of glass fiber-reinforced gypsum board produced according to the method of the invention.

Referring to FIG. 4, a portion of a three layered structure 105 is shown in cross-section and comprises a core 106 and outer glass fiber-reinforced layers or sheets 107 and 108 similar to the sheet 94 shown in FIG. 3. In accordance with one aspect of the invention, the core 106 has a relatively lower density and is substantially free of glass fibers, while the reinforced layers or sheets 107 and 108 have glass fibers 109 dispersed throughout, and have a relatively higher density. In a preferred form the core is made of foamed beta calcium sulfate hemihydrate, while the outer layers 107 and 108 contain glass fibers and are made of either alpha or beta calcium sulfate hemihdyrate. As disclosed above, the outer layers are rolled to increase their density. The outer surfaces 110 and 111 of the outer layers 107 and 108, respectively, are free of paper cover sheets, since, as a result of the densification rolling step, they acquire a very hard and strong surface. The entire board is highly fire-resistant and smoke-resistant, relatively light, and has excellent flexural strength.

FIG. 5 illustrates a subassembly for producing an embossed or textured surface on the outer surface of the sheet. The wetted sheet 87 is first passed through the densification rolls 93 and embossing roll 112 having a pattern on its surface operating against a standard roll 93. The resulting sheet 94 has an embossed pattern on the surface which is to become the outer surface of a completed gypsum board.

Figure 6:
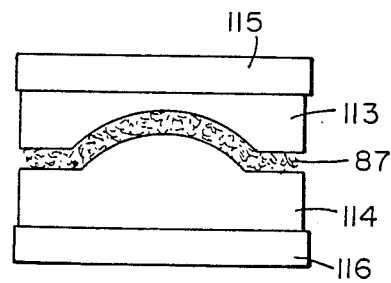
FIG. 6 is an end view of a mold which may be utilized to densify and shape the glass fiber-reinforced gypsum sheet.

FIG. 6 illustrates a means for forming the finished sheet 87 to any desirable form. The sheet 87 is placed between two complimentary mold forms 113 and 114 supported by press plattens 115 and 116. The assembly is placed in a press and the sheet 87 is wetted and molded to form and subsequently permitted to cure and to be dried.

EXAMPLES

The following examples are provided for illustrative purposes only and are not intended to be limiting.

EXAMPLE 1

Preparation of Glass Fiber-reinforced Gypsum Sheet.

Glass fiber strands cut to one half inch in length were processed to separate the strands into individual fibers having a diameter of about 0.00025 inch. The glass fibers were mixed together in a moving air current with beta calcium sulfate hemihydrate in a proportion wherein the glass fiber was present in an amount of ten percent (10%) by weight of the total glass and hemihydrate. The glass fibers and hemihydrate were mixed together in a moving air stream and the mixture deposited on a moving screen belt. The dry deposited sheet was wetted by a water spray wherein approximately thirty-five (35) pounds of water per one hundred (100) pounds of calcium sulfate hemihydrate were utilized. The sheet was densified by passing between two sets of rolls having a nip pressure of 118 lb/linear inch. After densification, the hemihydrate of the sheet was allowed to hydrate or set. The sheet was then dried to a constant weight at 110° F. The density of the sheet was about 75 lbs. per cubic foot and the thickness 0.030 inch.

Specimens were prepared from the sheet for tensile strength evaluation. The prepared specimens were 12 inches long, and 3 inches wide at each end. They were necked down to 2 inches in width for an 8 inch length starting about 2 inches from each end of the specimen. The specimens were conditioned at 75° F. and fifty percent (50%) relative humidity before testing. An Instron testing machine was used. The specimens were positioned in the machine fixture so that the load was applied to the 2 inch wide area with a elongation of 0.109 inch was required to cause failure of the material. A tensile load of about 163 pounds with an elongation of 0.074 inch was required to cause failure of a specimen of regular wallboard paper prepared in the same manner.

EXAMPLE 2

Preparation of Gypsum Wallboard Panels

A pair of glass fiber-reinforced gypsum sheets were prepared as described in Example 1. Immediately after densification of the gypsum sheets but before setting of the stucco had taken place, one sheet was placed in the bottom of a mold. A standard beta calcium sulfate hemihydrate wallboard slurry having conventional additives, including a foaming agent was poured onto the top of the gypsum sheet. The second sheet was then placed on top of the slurry and the structure was consolidated between rolls. The finished panel was about one-half inch thick. The dry density of the core was 45.4 pounds per cubic foot. Conventional accelerator and retarder materials were used in both the glass fiber containing gypsum sheets and the core slurry, and the compositions were so adjusted as to permit substantially simultaneous hydration or setting of the calcium sulfate hemihydrate in both the core and the outer sheets. In this manner a very good bond resulted between the layers as a result of the inner growth of crystals at the layer interfaces. After hydration or setting was complete, the panel was dried.

Specimens measuring 6×14 inches were cut from the panel. The specimens were conditioned at 75° F. and 50% relative humidity before testing. The bending or transfer strength was then determined by placing the specimen onto supports spaced 12 inches apart. A load was then applied from above at the center of the span causing the material to bend until failure. A load of 130 pounds causing a deflection of about 0.384 inch was applied before the specimen failed.

EXAMPLE 3

Comparative Example.

A conventional gypsum panel having standard paper cover sheets but no glass fiber reinforcements was prepared. The stucco was set and dried as in the pevious examples, and tested for transfer strength. With the conventional panel a bending load of only 108 pounds with a deflection of 0.234 inch was required to cause failure of the panel. The load test was made in the strong direction of the panel.

EXAMPLE 4

Testing under High Humidity.

Panels as made in Examples 2 and 3 were tested for resistance to deflection under humid conditions. The 12×24 inch specimens in each case were supported across the 12 inch end and maintained at 90° F. and 90% relative humidity conditions. After ten (10) days the deflection or sag of each panel was tested. The panel prepared with glass fiber-reinforced outer sheets showed a deflection of 0.075 inch, whereas the conventional panel having paper cover sheets had deflected about 0.195.

Although the invention has been described above in relation to the use of beta calcium sulfate hemihydrate as the settable cementitious material, the alpha form may also be used and for some purposes may yield superior products. Moreover, other settable cementitious materials may be used, such as a mixture of alpha calcium sulfate hemihydrate and cement, conventional hydraulic cement such as portland cement, magnesium oxychloride, and related materials. High early strength portland cements may also be used. It is only necessary to use a material which is compatible with the particular fiber used. For example, if portland cement is used, an alkali-resistant glass fiber must be used.

The invention has also been described in terms of its use with glass fibers for reinforcement. However, other fibers such as polyester, acrylic, nylon, carbon, rock wool, asbestos fiber, etc., may be used. The fiber lengths may be from one-half to six inches, preferably one-half to two inches. Where glass fiber strands are utilized, the fibers should first be opened up in a machine 13 such as that described above and then conveyed to the fiber feeder 14 which meters the fiber into the air stream of the web former. The feeder 77 then meters the cementitious materials such as calcium sulfate hemihydrate into the air stream. With the apparatus shown and described, it is convenient to introduce the glass fibers into the air stream first, and then to introduce the calcium sulfate hemihydrate downstream from the introduction of the glass fibers. Alternatively, the calcium sulfate hemihydrate may be introduced into the air stream first followed by the glass fiber downstream. In another satisfactory variation, the glass fibers and the calcium sulfate hemihydrate may be simultaneously introduced at the same position of the air stream. The important consideration is that the fibers and the calcium sulfate hemihydrate be uniformly blended within the air stream before thay are deposited onto the traveling condenser screen 79 where the web is formed.

Patterns such as wood grain, brick, etc., may be embossed into the surface of the sheet. The embossing is completed before hydration of the hemihydrate takes place. Subsequently the material is hydrated and dried. If the embossed sheet is to be utilized for making a laminated board, after embossing the sheet is applied to a calcium sulfate hemihydrate slurry for forming a core, and the sheet and core then hydrated and dried together.

Densification of the glass fiber-reinforced sheet may be accomplished by means other than rolls. As shown in FIG. 6, the dry sheet of glass fiber and stucco may be removed from the collector screen, placed onto the base of a mold and sprayed with sufficient water to hydrate the stucco and to render the sheet somewhat plastic. A matching section of the mold is then placed on top of the wetted sheet, the assembly placed between press plattens 115 and 116 and a force is applied to compact the sheets. A force of about 50 pounds per square inch is satisfactory, but the force may be varied to develop the desired density. With this process the sheet is simultaneously densified and molded into various desired shapes.

The process of the present invention has many advantages over prior art processes. First, because the fibers and dry cementitious material is mixed in an air stream, excellent mixing is accomplished without any clumping of the fibers. The problem of separating the strands or tufts of fiber into individual filaments is overcome by processing the fiber before it is mixed with the stucco and then suspending the filaments in an air stream. When the stucco is then fed into the air stream, thorough blending of the fiber and gypsum is accomplished without any clumping.

Because the sheet of glass fiber and stucco is formed in the dry state, it is unnecessary to use a large amount of water to fluidize the material. Only sufficient water need be utilized to stoichiometrically hydrate the stucco and to make it sufficiently plastic so that it can be densified. The ability to use varying amounts of water and to densify the sprayed sheet to varying degrees permits the production of glass fiber-reinforced gypsum sheet with a wide range of properties. If high tensile strengths are desired, the gypsum matrix sheet should be densified to a high degree. However, for some applications as for example the fabrication of art objects, a high tensile strength is not required but a more desirable low density article may be produced which has good impact and crack-resistance. To achieve this, higher amounts of water and lower densification pressure may be used. In the fabrication of calcium sulfate dihydrate sheets, additives are commonly added to control the rate of hydration. Additionally additives to increase the plasticity of the mix may be used. Polymers may also be used to increase the toughness of the article or to improve painting properties. All the conventional additives may be used in the present process to the extent that they are compatible with the particular fiber used. The additives may be blended with the dry stucco, or, those which are water soluble, may be added to the water used to wet the sheet.

In producing products according to the invention, various glass fiber parameters may be utilized. For example, the amounts of glass fiber used may be from 3-25% based on the weight of the dry formed sheet. The preferred range is from 6-10%. The glass fiber length may be from one half to six inches. A preferred length is from one to three inches. Glass fibers having diameters of 0.00023 to 0.007 inch may be utilized. A preferred range is 0.00025 to 0.00038 inch. The water to gypsum hemihydrate ratio may be from 0.25 to 0.60 by weight. A preferred ratio is 0.30 to 0.45.

The present invention has many advantages over processes disclosed in the prior art and over products produced by these processes. First, by introducing fibers which have been treated to transform them into individual fibers, and introducing the fibers into a moving air stream causes an excellent separation of the fibers and prevents clumping. The introduction of the cementitious setting material into the moving air stream results in excellent and uniform mixing of the fibers and cementitious material. Finally, the co-deposition of the mixture contained in the air stream on a moving foraminous screen results in a web of fibers and cementitious material in very uniform distribution. One advantage is that because of the vacuum applied at the leeward side of the stream, the fibers may be deposited with an orientation wherein they are somewhat oblique to the plane of the web, and this causes vertical interweaving of the fibers to produce a material of greater perpendicular tensile strength. Additionally, the step of spraying water onto the moving web in an amount which is not materially greater than the stoichiometic amount conserves on energy required for drying the material and also results in a material of greater strength because large excesses of water are not required to provide the necessary conventional fluidity of the mixture, since the sheet is dry formed and can be densified or further formed with the use of relatively small amounts of water. Additionally, when two sheets according to the invention are bonded to a gypsum core, no starch need be utilized for bonding.

It is to be understood that the invention is not to be limited to the exact details of composition, materials or operation shown or described, as obvious modifications and equivalents will be apparent to one skilled in the art.

What is claimed is:

1. A method for preparing a cementitious construction sheet having reinforcing fibers dispersed therein, which comprises:
   (a) mixing together in a moving air current generated by an air blower a substantially dry water-settable calcium sulfate hemihydrate in finely particulate form with reinforcing glass fibers,
   (b) providing a foraminous moving surface,
   (c) depositing the mixture of calcium sulfate hemihydrate and glass fibers on said foraminous surface to form a sheet,
   (d) applying water over the sheet,
   (e) permitting the calcium sulfate hemihydrate to set, and
   (f) drying said sheet to remove any excess water.

2. A method according to claim 1, wherein said water is applied by spraying.

3. A method according to claim 2, wherein a vacuum is applied below said moving foraminous surface to assist in directing said cementitious material and said fibers toward said surface.

4. A method according to claim 2, wherein said sheet is densified by compression prior to setting.

5. A method according to claim 2, wherein the amount of water is not substantially greater than the stoichiometric amount necessary to hydrate and set said cementitious material.

6. A method according to claim 1, wherein said calcium sulfate hemihydrate is in the beta form.

7. A method according to claim 1, wherein said calcium sulfate hemihydrate is in the alpha form.

8. A method according to claim 2, wherein said cementitious material is a mixture of alpha calcium sulfate hemihydrate and hydraulic cement.

9. A method according to claim 2, wherein said cementitious material is a hydraulic cement.

10. A method according to claim 2, wherein said cementitious material is very high early strength hydraulic cement.

11. A method according to claim 2, wherein the thickness of said sheet is from about 0.010 inch to about 0.250 inch.

12. A method according to claim 2, wherein the weight of fibers is from about 3% to about 25% based on the weight of the dry formed sheet.

13. A method according to claim 2, wherein the weight of fibers is from about 6% to about 10% based on the weight of the dry formed sheet.

14. A method according to claim 1, wherein said glass fibers are formed by chopping glass fiber strands and subsequently opening the chopped strands into individual fibers.

15. A method according to claim 5, wherein said sheet is densified by passing it between compression rolls.

16. A method according to claim 2, wherein a pattern is applied to one surface by embossing prior to setting said cementitious material.

17. A cementitious construction sheet having reinforcing fibers dispersed therein, said sheet being the product formed by the method which comprises:
(a) mixing together in a moving air current generated by an air blower a substantially dry water-settable calcium sulfate hemihydrate in finely particulate form with reinforcing glass fibers,
(b) providing a foraminous moving surface,
(c) depositing the mixture of calcium sulfate hemihydrate and glass fibers on said foraminous surface to form a sheet,
(d) applying water over the sheet,
(e) permitting the calcium sulfate hemihydrate to set, and
(f) drying said sheet to remove any excess water.

18. A sheet according to claim 17, wherein said water is applied by spraying.

19. A sheet according to claim 18, wherein a vacuum is applied below said moving foraminous surface to assist in directing said cementitious material and said fibers toward said surface.

20. A sheet according to claim 18, wherein said sheet is densified by compression prior to setting.

21. A sheet according to claim 18, wherein the amount of water is not substantially greater that the stoichiometric amount necessary to hydrate and set said cementitious material.

22. A sheet according to claim 17, wherein said calcium sulfate hemihydrate is in the beta form.

23. A sheet according to claim 17, wherein said hemihydrate is in the alpha form.

24. A sheet according to claim 18, wherein said cementitious material is a mixture of alpha calcium sulfate hemihydrate and hydraulic cement.

25. A sheet according to claim 18, wherein said cementitious material is a hydraulic cement.

26. A sheet according to claim 18, wherein said cementitious material is very high early strength hydraulic cement.

27. A sheet according to claim 18, wherein the thickness of said sheet is from about 0.010 inch to about 0.250 inch.

28. A sheet according to claim 18, wherein the weight of fibers is from about 3% to about 25% based on the weight of the dry formed sheet.

29. A sheet according to claim 18, wherein the weight of fibers is from about 6% to about 10% based on the weight of the dry formed sheet.

30. A sheet according to claim 35, wherein said glass fibers are formed by chopping glass fiber strands and subsequently opening the chopped strands into individual fibers.

31. A sheet according to claim 20, wherein said sheet is densified by passing it between compression rolls.

32. A sheet according to claim 18, wherein a pattern is applied to one surface by embossing prior to setting said cementitious material.

* * * * *

UNITED STATES PATENT AND TRADEMARK OFFICE
CERTIFICATE OF CORRECTION

PATENT NO. : 4,233,368
DATED : November 11, 1980
INVENTOR(S) : Donald O. Baehr & David G. Izard It is certified that error appears in the above—identified patent and that said Letters Patent is hereby corrected as shown below:

In the Specification:

Column 2, line 63, change the word "one" to --the--.

Column 8, line 31. after 0.195 add the word --inch--.

In the Claims:

Column 12, line 37, change "35" to --17--.

Signed and Sealed this

Twenty-fourth Day of February 1981

[SEAL]

Attest:

RENE D. TEGTMEYER

Attesting Officer     Acting Commissioner of Patents and Trademarks